Jan 6, 1931.  E. WALDMAN  1,787,605
MOLDING MACHINE
Filed Jan. 23, 1928   3 Sheets-Sheet 1
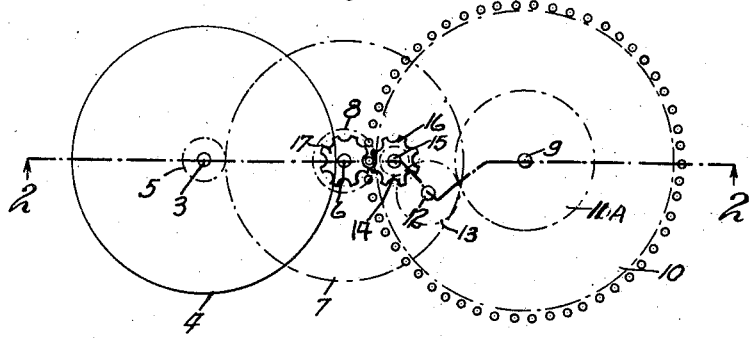
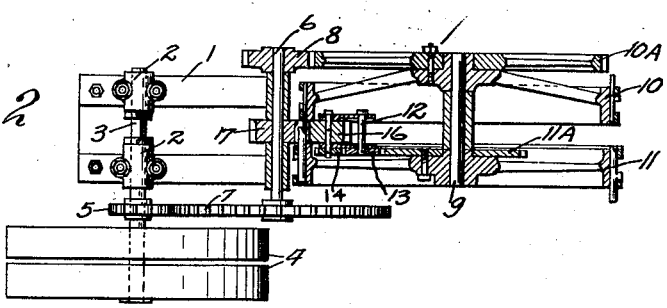
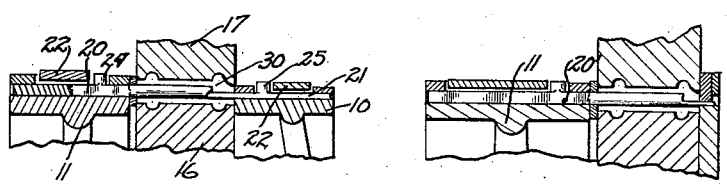
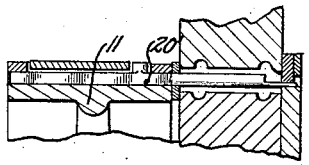
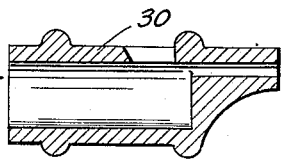
Inventor
Ernest Waldman
by Henry Blech
Attorney.

Jan 6, 1931.  E. WALDMAN  1,787,605
MOLDING MACHINE
Filed Jan. 23, 1928  3 Sheets-Sheet 2
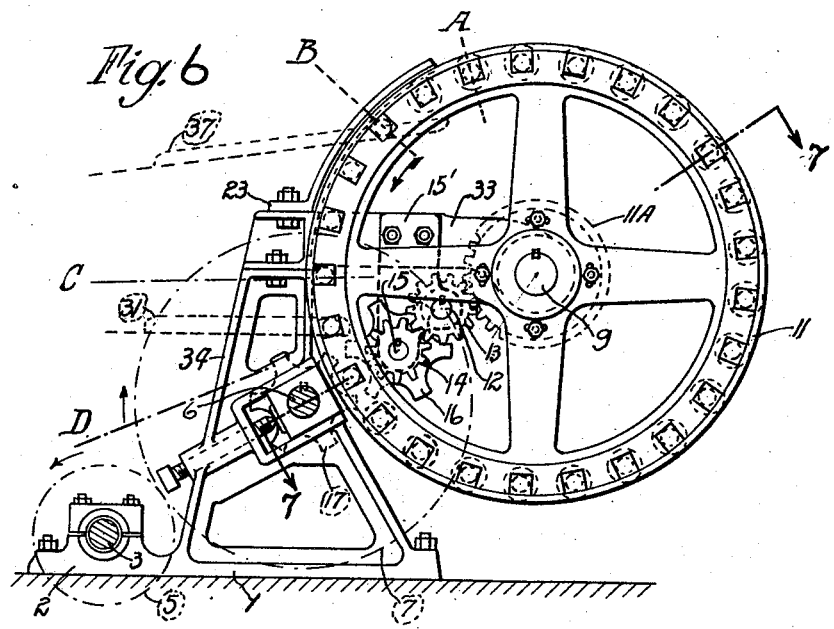
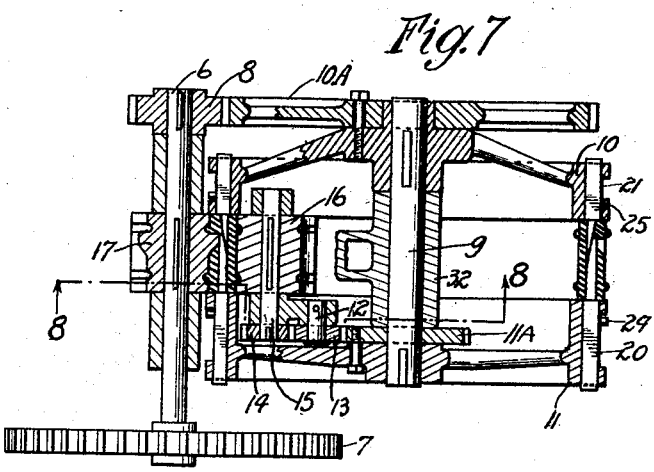
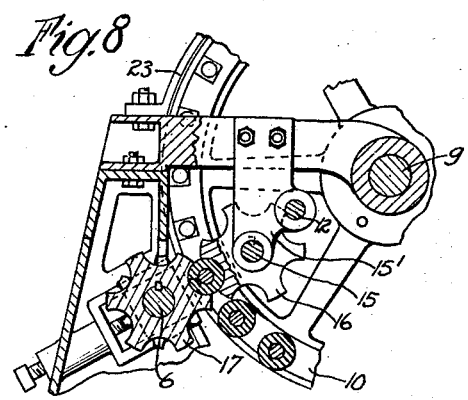
Inventor
Ernest Waldman
by Henry Mesh
Attorney.

Jan 6, 1931.  E. WALDMAN  1,787,605
MOLDING MACHINE
Filed Jan. 23, 1928  3 Sheets-Sheet 3
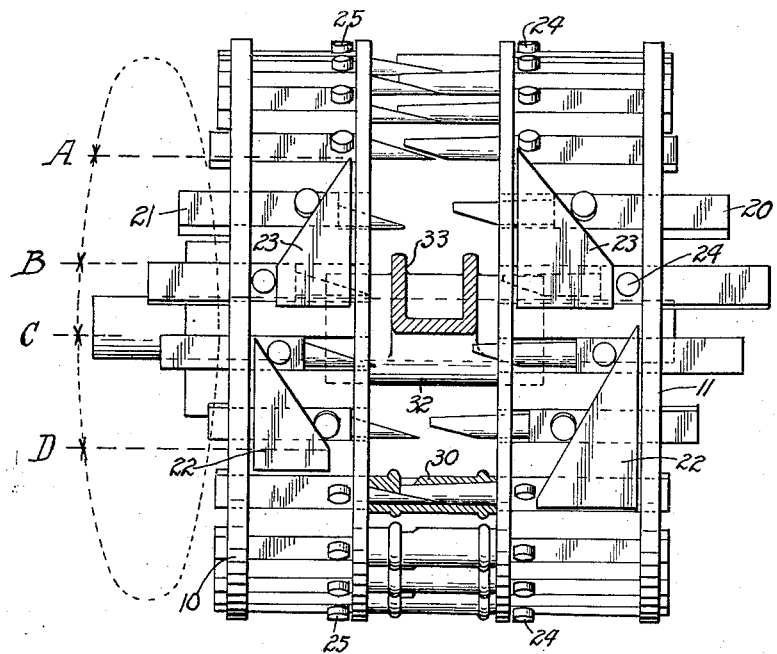
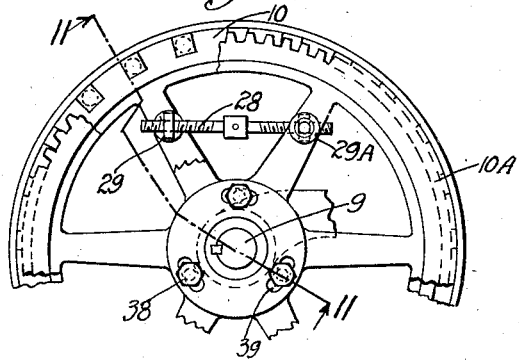
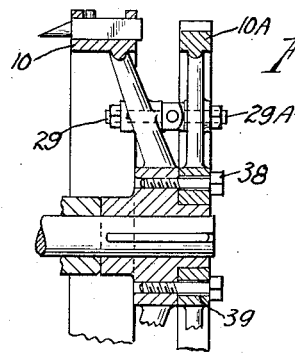
Inventor
Ernest Waldman
by Henry Bleek
   Attorney.

Patented Jan. 6, 1931

1,787,605

UNITED STATES PATENT OFFICE

ERNEST WALDMAN, OF CHICAGO, ILLINOIS

MOLDING MACHINE

Application filed January 23, 1928, Serial No. 248,713, and in Germany February 8, 1927.

The invention relates to molding machines and more particularly to machines for producing hollow bodies from plastic material such as hard rubber, clay, candy whistles, bottles, tubes or the like.

It is an object of the invention to provide a machine of the character described which efficiently and speedily forms hollow articles.

It is a further object to provide a molding machine wherein a pair of form-cylinders are rotated in opposed directions and cores are reciprocated therebetween, to introduce the plastic material between the cylinders, to permit the material to dry on the cores, and to release the dried and ready article for further conveyance.

A still further object is to provide the co-operating cores on a rotary wheel having a large diameter as compared with the diameter of the form cylinders so that the cores execute a relative movement with respect to the form holes of said cylinders and thereby effect a kneading of the plastic material in addition to the introduction of said material in the form holes and also a removal of the finished article. It is a still further object to positively drive the form cylinders and core wheel to rotate synchronously so that during the molding operation no leading or lagging of pacts with respect to others can take place.

With these and other objects in view which will become apparent from the following description, the invention comprises the means described.

Fig 1 is a diagrammatic view of the drive means for the form-cylinders and cores.

Fig. 2 is a section on the line 2—2 of Fig. 1.

Fig. 3 is an enlarged section of the core composed of two parts and introduced between the form-cylinders.

Fig. 4 is a view similar to Fig. 3 but modified to provide a unitary core.

Fig. 5 is section through a candy whistle made with the machine.

Fig. 6 is an elevational view of the machine constructed in accordance with my invention.

Fig. 7 is a section on line 7—7 of Fig. 6.

Fig. 8 is a section on line 8—8 of Fig. 7.

Fig. 9 is an elevational section.

Fig. 10 is a fragmentary elevational view to disclose adjusting means for the core carrier.

Fig. 11 is a section on the line 11—11 of Fig. 10.

Referring to the drawings, 1 designates the base of the machine on which are provided bearings 2 in which is journaled a drive shaft 3. The shaft has secured thereto pulleys 4 and a pinion 5 in mesh with a gear 7 fast on a shaft 6. On the other end of the shaft 6 is secured a pinion 8 in mesh with a gear 10A connected to a disc 10 fast on a shaft 9. The shaft rests in a central bearing 32 at the free end of a horizontal arm 33 which projects from the frame 34 of the machine. At the other end of the shaft 9 a disc 11 is secured to which is connected a gear 11A meshing with an intermediary gear 13 on a stub shaft 12. The gear 13 meshes with a pinion 14 fast on a shaft 15 on which is provided one form-cylinder 16 juxtaposed to another form-cylinder 17 provided on the shaft 6. The shafts 12 and 15 are journaled in a common bearing 15'. The circumference of the form-cylinders is shaped to provide one-half of the outer form of the article to be produced so that the two form cylinders define together the outer form of the article such as a candy whistle 30 (Figure 5) as is evident from the detail sections shown in the Figures 3 and 4.

The rims of discs 10 and 11 are provided with ports in which cores 20 and 21 are slidably arranged. The rims form closures for the mold cavities of the cylinders and thereby prevent lateral egress of the plastic material. In order to reciprocate the cores cams 22 and 23 are provided on the frame of the machine. The cams are so arranged that before the form-cylinders occupy the position in which they completely define the form of the article to be produced, the integral lugs 24 and 25 of the cores 20 and 21 strike the cams 22 whereby both cores are moved toward each other in the hopper 31. When the two halves of the forms provided in the cylinders 16 and 17 are completely closed the cores are arranged in concentric relation to the form thus provided and the plastic material is pressed therearound by the rotation of the cylinders. The core remains in contact with the material in order to permit drying thereof until the lugs 24 and 25 come in contact with the cams 23 and which cams slant in opposite direction to the cams 22. These cams 23 cause the cores to be returned to the original position permitting the released candy whistle or the like to drop and to be received in a hopper or conveyer 37 (Fig. 6). The cams 23 serve to open the cores while moving from position A to position B as shown in Fig. 9. The cores remain open until they reach the position C so that they clear the stationary arm 33. In the rotary movement to position D the cores are being closed by the cams 22 and they remain closed during the remainder of the circular movement to afford the material sufficient time for drying. In the modification shown in Figure 4 only one disc 11 is provided and a single core 20' is utilized which is reciprocated in a similar manner as the two cores 20 and 21.

In order to make sure that the form-cylinders concentrically surround the cores, a suitable adjustment is provided so that the relative position between cores and the form opening in the cylinder 16 may be varied. For the adjustment of the cylinders of the cylinder 16, the left and right hand screw 28 is provided which with one end engages a nut 29 secured to a spoke of the disc 10 whereas the other end is threaded into a nut 29A secured to a spoke of the gear 10A. If the screw which connects the disc and the gear is loosened and after the screws 38 securing the gear 10A through slots 39 to the disk 10 have been loosened the screw 28 is turned, then the gear 10A is slightly rotated and the form-cylinder 17 secured to the shaft 6 may be correctly adjusted.

While the drawing discloses preferred embodiments of the invention numerous changes and alterations may be made without departing from the spirit of the invention. I, therefore, do not confine myself to the details of construction and arrangement as shown but want to include all revisions, changes and alterations which fairly fall within the scope of the invention as defined in the appended claim.

I claim:

A molding machine including a pair of cooperating cylinders having complementary mold cavities at their circumferences, a pair of disks of larger diameter than said cylinders and forming end closures for said cavities with their rims, said disks rotating about an axis extraneous to said cylinders and cores slidable in said rims for entry and ejection into said cavities, means for reciprocating said cores, and means for imparting synchronous drive to said cylinders and said disks.

In witness whereof I affix my signature.

ERNEST WALDMAN.